United States Patent
Kilic (10) Patent No.: US 10,261,397 B2
(45) Date of Patent: Apr. 16, 2019

(54) CAMERA DEVICE FOR FASTENING TO AN ESPECIALLY OPTICAL SIGHTING DEVICE

(71) Applicant: Michael Ali Kilic, Schwebheim (DE)

(72) Inventor: Michael Ali Kilic, Schwebheim (DE)

(*) Notice: Subject to any disclaimer, the term of this patent is extended or adjusted under 35 U.S.C. 154(b) by 241 days.

(21) Appl. No.: 15/110,287

(22) PCT Filed: Jan. 12, 2015

(86) PCT No.: PCT/EP2015/050428
§ 371 (c)(1),
(2) Date: Oct. 3, 2016

(87) PCT Pub. No.: WO2015/104416
PCT Pub. Date: Jul. 16, 2015

(65) Prior Publication Data
US 2017/0017139 A1 Jan. 19, 2017

(30) Foreign Application Priority Data

Jan. 10, 2014 (TR) .................................. 2014/00305
Feb. 7, 2014 (DE) ........................ 20 2014 100 544

(51) Int. Cl.
*G03B 17/48* (2006.01)
*F41G 11/00* (2006.01)
(Continued)

(52) U.S. Cl.
CPC ............... *G03B 17/48* (2013.01); *F41G 1/38* (2013.01); *F41G 1/46* (2013.01); *F41G 3/2605* (2013.01);
(Continued)

(58) Field of Classification Search
CPC .......... F41G 11/00; F41G 11/004; F41G 1/38; F41G 1/46; F41G 3/2605; G03B 17/17;
(Continued)

(56) References Cited

U.S. PATENT DOCUMENTS 4,930,883 A * 6/1990 Salzman ............... G02B 7/1821
359/419
5,020,262 A * 6/1991 Pena ...................... G03B 29/00
396/432
(Continued)

FOREIGN PATENT DOCUMENTS

CN          87 207 514          4/1988
CN          201 156 139         11/2008
(Continued)

OTHER PUBLICATIONS

The International Search Report as dated Apr. 24, 2015 for International Application No. PCT/EP2015/050428.
(Continued)

*Primary Examiner* — Thai Q Tran
*Assistant Examiner* — Stephen R Smith
(74) *Attorney, Agent, or Firm* — Quarles & Brady LLP (57) ABSTRACT

The invention relates to a camera device for fastening to an eyepiece tube of a telescopic sight. For this purpose, a deflection module (12, 51) is fastened to the eyepiece tube by means of an assembly module (01, 50). A semi-permeable device (28) for deflecting the image from the axis of the telescopic sight is arranged in the deflection module (12, 51), which (28) enables a straight view through the device on the one hand. On the other hand, the image is deflected towards a camera module (34, 52) also arranged at the deflection module. The assembly module (01, 50), the deflection module (12, 51) and/or the camera module (34, 52) are detachably connected to each other.

21 Claims, 3 Drawing Sheets

(51) Int. Cl.
*F41G 1/38* (2006.01)
*F41G 1/46* (2006.01)
*F41G 3/26* (2006.01)
*G03B 17/17* (2006.01)
*G03B 17/56* (2006.01)
*H04N 5/225* (2006.01)

(52) U.S. Cl.
CPC ............ *F41G 11/00* (2013.01); *F41G 11/004* (2013.01); *G03B 17/17* (2013.01); *G03B 17/565* (2013.01); *G03B 17/566* (2013.01); *H04N 5/2252* (2013.01)

(58) Field of Classification Search
CPC .... G03B 17/48; G03B 17/565; G03B 17/566; H04N 5/2252
USPC .......... 348/158, 373, 375; 42/111, 114, 119, 42/124, 90; 434/19; 235/404; 396/428
See application file for complete search history.

(56) References Cited

U.S. PATENT DOCUMENTS

| | | | | |
|---|---|---|---|---|
| 2002/0002788 A1* | 1/2002 | Hope | ............... | F41C 27/00 42/106 |
| 2005/0128533 A1* | 6/2005 | Maruta | ............... | H04N 1/03 358/483 |
| 2005/0213959 A1* | 9/2005 | Chiang | ............... | G02B 23/16 396/428 |
| 2009/0051806 A1* | 2/2009 | Haubmann | ............... | G03B 17/14 348/347 |
| 2009/0128934 A1* | 5/2009 | Plangger | ............... | G02B 21/362 359/827 |
| 2013/0076925 A1* | 3/2013 | Tsai | ............... | H04N 5/2253 348/208.99 |
| 2013/0251358 A1* | 9/2013 | Kuehl | ............... | G02B 21/36 396/428 |
| 2015/0029336 A1* | 1/2015 | Kucheryuk | ............... | H04N 7/183 348/148 |
| 2015/0156380 A1* | 6/2015 | Volfson | ............... | G03B 17/566 348/373 |

FOREIGN PATENT DOCUMENTS

| | | |
|---|---|---|
| EP | 2 003 482 | 12/2008 |
| GB | 846 917 | 9/1960 |
| WO | 99/27318 | 6/1999 |

OTHER PUBLICATIONS

PCT English Language Translation of the International Preliminary Report on Patentability, PCT/EP2015/050428, dated Jul. 21, 2016, 9 pages.

\* cited by examiner

CAMERA DEVICE FOR FASTENING TO AN ESPECIALLY OPTICAL SIGHTING DEVICE

CROSS-REFERENCE TO RELATED APPLICATIONS

This application represents the national stage entry of PCT International Application No. PCT/EP2015/050428 filed Jan. 12, 2015 and claims priority to Turkish Patent Application No. 2014/00305 filed Jan. 10, 2014 and German Utility Model Application No. 20 2014 100 544.7 filed Feb. 7, 2014. The contents of this application are hereby incorporated by reference as if set forth in their entirety herein.

The invention relates to a camera device for fastening to an eyepiece tube of an optical device, in particular a telescopic sight, a spyglass or a telescope, according to the preamble of claim 1.

Camera devices of the aforementioned type preferably but by no means exclusively serve for documenting, securing evidence and surveilling. Thus, in the field of hunting, the situations experienced during and after a shot, for example, can be recorded and used as an image or video for memory. In particular for military and police purposes as well as for security personnel, such documentation of shooting situations can be of tremendous importance for securing evidence, for example. Such systems can also be used for training shooters, either for subsequent inspection of the recorded images or for real-time transmission of the recorded images to an instructor.

Generic camera devices are known from the state of the art, in which image capturing takes place outside a telescopic sight parallel to its optical axis. Withal, the device for image capturing, however, shows a parallaxly displaced image whose accuracy, in particular when shooting takes place at varying distances, is regularly found to be insufficient. In particular, if the device for image capturing is fastened to a telescopic sight, the target acquisition is additionally impeded by limitations of the shooter's vision. Another disadvantage of known image capturing systems is that the arrangement on a weapon or a telescopic sight is complex and requires a cumbersome adjustment. If a renewed assembly is carried out after detaching the device, another adjustment is required.

Based on the known state of the art, it is the object of the invention at hand to propose a camera device for fastening to the eyepiece tube of an optical device, in particular a telescopic sight, a spyglass or a telescope, which does not impede the shooter's target acquisition and has a high accuracy.

This object is attained by a camera device according to the teachings of claim 1.

Advantageous embodiments of the invention are the subject-matter of the dependent claims.

The camera device according to the invention is intended for fastening to the eyepiece tube of an optical device. Said optical device can in particular be a telescopic sight, a spyglass or a telescope. Even though the invention is subsequently further described using a telescopic sight by way of example, this should not be understood as a limitation to said type of optical device.

According to the invention, the camera device comprises an assembly module, a deflection module and a camera module. The assembly module essentially serves for fastening the camera device to the eyepiece tube. The deflection module is provided with a device, arranged in a housing, for deflecting the image from the axis of the optical device; wherein the device for deflection is semi-permeable and is formed and arranged in such a way that viewing through the optical device is enabled when the camera device is arranged on the optical device. Moreover, according to the invention, a camera module for recording and/or forwarding the image is provided. The assembly module, the deflection module and/or the camera module are detachably connected with each other, according to the invention.

This design means that when a camera device is arranged on the eyepiece tube of a telescopic sight, the telescopic sight is still usable without limitation due to the semi-permeability of the device for image deflection, on the one hand, and that the image recorded in the camera module corresponds exactly to the image the shooter sees in the eyepiece of the telescopic sight, on the other hand. Furthermore, due to the detachability of the modules, the assembly module can remain at the telescopic sight, while the deflection module and the camera module can be detached. Conversely, the deflection module and the camera module can be fastened again to the assembly module without any substantial limitations to accuracy, whereby a high repetitive accuracy of the optical assembly is achieved.

The way in which the assembly module is mounted at the eyepiece tube is basically arbitrary, as long as it is ensured that the camera device is adequately fastened to the eyepiece tube, in particular so as to absorb the recoil forces of the shot. Thus, in the simplest case, the assembly module can be provided with an internal thread and can be screwed on an external thread of the eyepiece tube. According to a preferred embodiment of the invention, however, the assembly module comprises a double-shell structure having two assembly shells, wherein a generally more or less cylindrical space essentially corresponding to the outer contour of the eyepiece tube is formed between the two assembly shells. Thereby, both assembly shells are clampable against each other by means of a clamping device while enclosing the eyepiece tube in a force-fitting and/or form-fitting manner at least in sections. According to this embodiment, the eyepiece tube does not require any fastening elements, such as an external thread, for example, so that the assembly module can be used for a plurality of telescopic sights having a defined outer diameter or outer diameter range. If the outer diameter of the eyepiece tube deviates from the permitted diameter range, insertion strips or insertion shells, for example, which reduce the free clamping diameter, can be used in the assembly shells in the case of smaller outer diameters. As a general rule, however, an assembly shell having a clamping diameter adapted for a specific telescopic sight is used, so that the assembly shell simultaneously functions as an adapter.

In order to fasten the deflection module to the assembly module, in another embodiment of the invention, the assembly module can comprise a fastening ring in the area of the end of the assembly module pointing towards the deflection module, said fastening ring having a fastening device for detachable fastening of the deflection module. Thereby, said fastening ring can comprise a bearing surface on its side pointing towards the optical device, i.e. generally towards the telescopic sight, for direct or indirect bearing of the frontal end of the eyepiece tube. Thus, said bearing surface ensures that the entire camera device can be arranged in a defined position in the axial direction of the telescopic sight.

Preferably, said bearing surface can be formed at least slightly conical, i.e. forming a cone tapering in the direction of the telescopic sight. In connection with the collar-side end of the eyepiece tube which then sits on the cone, an automatic centering of the assembly module and thus of the entire camera device on the eyepiece tube in relation to the optical axis of the telescopic sight is achieved. This allows for an even higher accuracy.

According to another embodiment of the invention, a centering ring can be arranged between the frontal end of the eyepiece tube and the bearing surface, said centering ring being formed at least slightly conical at least on its side pointing towards the eyepiece. Thus, a conical design of the bearing surface is not necessary. However, it is also possible that the bearing surface, as described above, is formed conical and at the same time the centering ring is double-conical, i.e. conical on both sides. Thus, a centering of the centering ring in the assembly module as well as a centering of the assembly module in relation to the optical axis of the telescopic sight is achieved.

The fastening ring can basically be formed in any desired manner, for example separately, or can be fastened to one or both assembly shells. Preferably, in a preferred embodiment of the invention, however, the fastening ring is molded in one piece to a first one of the two assembly shells.

The second assembly shell can, for example, essentially have the same length as the first assembly shell and can be arranged opposing the first assembly shell from the fastening ring to the collar-side end. Preferably, however, the second assembly shell is formed shorter and ends with a spacing from the fastening ring. Thus, a window is formed in the assembly module, through which, for example, a diopter setting provided at the eyepiece tube, if applicable, can be actuated even when the assembly module is attached, in order to compensate for a defective vision of a shooter.

In turn, the clamping of both assembly shells at the eyepiece tube can basically be carried out in any desired manner, for example by means of easily actuatable clamping levers or the like. Since, however, as a general rule, the assembly module remains at the eyepiece tube, clamping screws are used in accordance with another embodiment. Thus, the clamping device comprises at least one clamping screw which engages through one of the two assembly shells via a recess arranged at its edge and engages with an internal thread likewise arranged at the edge of the other assembly shell. As a general rule, two or four clamping screws in relation to the arrangement of the optical axis of the telescopic sight are used in order to ensure a secure fastening on the one hand and to prevent a possible budging of the eyepiece tube on the other hand.

The fastening of the deflection module to the assembly module can be carried out in different ways. Without departing from the scope of the invention, it is possible, for example, to provide the fastening ring with an internal thread, into which a flange, provided with a corresponding external thread and being arranged at the housing of the deflection module, can be screwed. Even though the firmness of such a connection is quite sufficient, it does have the disadvantage of not being able to predefine the turning position of the deflection module or of the unit comprising the deflection module and the camera module, respectively. Therefore, according to a particularly preferred embodiment of the invention, the fastening device is formed in the type of a bayonet catch and comprises at least two locking recesses, with which locking projections, each being arranged complementary thereto in form and/or in function at the housing of the deflection module, are detachably engageable via an insert-and-turn movement. Thus, the connection to the assembly module that remains attached to the eyepiece tube can easily be released and restored, on the one hand, while the camera device is in an exactly defined position after having been attached, on the other hand. If, for example, for a right-handed shooter the camera module is to be arranged in a different position than for a left-handed shooter, this is achieved by releasing the clamping of the assembly shells, turning the entire device by 180 degrees, for example, and subsequently re-tightening the clamping.

In order to facilitate an even easier adjustment, in particular, at least four locking recesses are provided in the fastening device according to a particularly preferred embodiment. Thus, if two or also four or more locking projections are correspondingly arranged at the housing of the deflection module, a fastening option in different defined turning positions is obtained. If, for example, four locking recesses and four locking projections are provided in a symmetrical arrangement offset by 90 degrees, four predefined positions of the camera device according to the invention are obtained.

In order to prevent an unintended detachment of the deflection module or of the unit comprising the deflection module and the camera module from the assembly module and consequently from the telescopic sight, a locking device is provided at the fastening ring, according to another embodiment. Preferably, the locking device comprises a spring-mounted safety latch which is displaceably mounted in a recess of the fastening ring. Thus, the safety latch can be brought, via an actuating element, from a first position, in which a turning of the deflection module relative to the assembly module is blocked, into a second position, in which the deflection module and the assembly module are turnable relative to each other and are therefore detachable. In order to ensure an easy actuation of the safety latch in different turning positions of the camera device, the fastening ring can comprise at least two differently arranged recesses spaced from each other in a circumferential direction, in which recesses the spring-loaded safety latch and the actuating element can be assembled as desired. Preferably, two recesses are arranged diametrically opposite each other in relation to the axis of the telescopic sight.

According to a particularly preferred embodiment of the invention, the housing of the deflection module comprises a first housing aperture, a second housing aperture and a third housing aperture, wherein the first housing aperture and the second housing aperture are aligned behind each other in the direction of the optical axis of the telescopic sight, and the third housing aperture is arranged angularly, in particular essentially at right angles, thereto. Thereby, the device for image deflection is arranged in the housing in such a way that the image entering via the first housing aperture along the optical axis of the telescopic sight is forwarded by the semi-permeable device for image deflection via the second housing aperture to the shooter's eye as well as via the third housing aperture out of the deflection module to the camera module.

The type of device for image deflection used is basically arbitrary, as long as a deflection on the one hand and a semi-permeability on the other hand are ensured. Preferably, the device for image deflection comprises a semi-permeable mirror or a semi-permeable prism arrangement. The prism arrangement can consist of partial prisms which are glued, pressed or connected via adhesion forces to each other.

In order to correspondingly project the image coming from the eyepiece tube of the telescopic sight for said image to be recorded by the camera, a lens device in the type of an objective can be provided either in the deflection housing upstream or downstream of the device for image deflection or in the housing of the camera module.

According to an embodiment of the invention alternative to the embodiment of the assembly module described above, the assembly module comprises two semi-shells which are clampable against each other while enclosing the collar-side end of the eyepiece tube and a flange-like collar surrounding the first aperture of the deflection housing at least in sections. Thereby, the deflection module is essentially freely turnable relative to the assembly module when the clamping device is released at least slightly. In contrast to the embodiment described above, in this embodiment the assembly module does not remain at the telescopic sight after removal of the camera device. When mounting the camera device, however, said camera device is clampable to the telescopic sight in any desired turning or angular position.

In a preferred embodiment of the invention, the camera device as such can comprise at least one image sensor, in particular in the form of a CCD chip or CMOS chip, said image sensor being arranged in the housing of the camera module. Furthermore, a device for processing, storing and/or forwarding the data received from the image sensor in the camera module can be provided. The images can be recorded as individual images or videos and can already be pre-processed into JPEGs from the raw data, if applicable. Storing can be carried out on internal RAMs, which can subsequently be read, or on exchangeable memory devices, in particular SD cards or micro SD cards. Reading can be carried out via standardized interfaces, in particular USB. Furthermore, a wireless transmission via Bluetooth, Wi-Fi or a GSM interface, for example, is also possible either in real-time or with a time delay.

In particular for application in the field of security personnel, the wireless transmission module, in particular the GSM module, in the camera module can also be used for bi-directional communication with mission control, for example. For this purpose, the camera module can comprise a speaker or an interface for connecting headphones or earphones.

Actuation of the camera device can be carried out via actuating elements, such as actuating buttons, for example, with which in particular the camera can be turned on and off and the operation modes video/photo as well as mute/sound can be selected. According to an embodiment, the camera unit can be controlled via a remote control or a corresponding application on a smart phone, for example.

Furthermore, the power supply of the camera module can be provided via an external power pack or via internal batteries or rechargeable batteries.

Furthermore, a microphone arrangement can be provided in the housing of the camera module in order to store and/or transmit sound signals along with the image.

A particularly compact design of the camera module is realized if, according to another embodiment, the image sensor, the device for processing, the device for storing and/or the device for forwarding the data received from the image sensor are arranged on a circuit board.

In basically any desired manner, the assembly shells of the assembly module, the housing of the deflection module and/or the housing of the camera module can be made of a plastic material. Preferably, however, in particular considering the high safety demands, said elements consist of metal, in particular aluminum or an aluminum alloy, in particular a high-strength aluminum alloy.

In order to reliably prevent short circuits when using metal housings, according to another embodiment of the invention, the image sensor, the devices for processing, storing and/or forwarding the data received from the image sensor and/or the circuit board are arranged on a plastic carrier made of an electrically non-conducting material.

The invention can be used in particular for the following purposes:
recording hunting scenes as videos instead of photos, said videos being recorded during hunting as a memory after the kill;
recording the flora and fauna observed with the telescopic sight;
ensuring that the responsible operation leaders during operations of security units can follow operations simultaneously, and reducing the failure rate;
recording a surveillance moment and collecting evidence;
reducing errors and gaining time when training shooters because the invention ensures that the instructor and the trainee see the shots simultaneously.

In the following, the invention is further explained by way of illustrations only showing exemplary embodiments.

Figure 1:
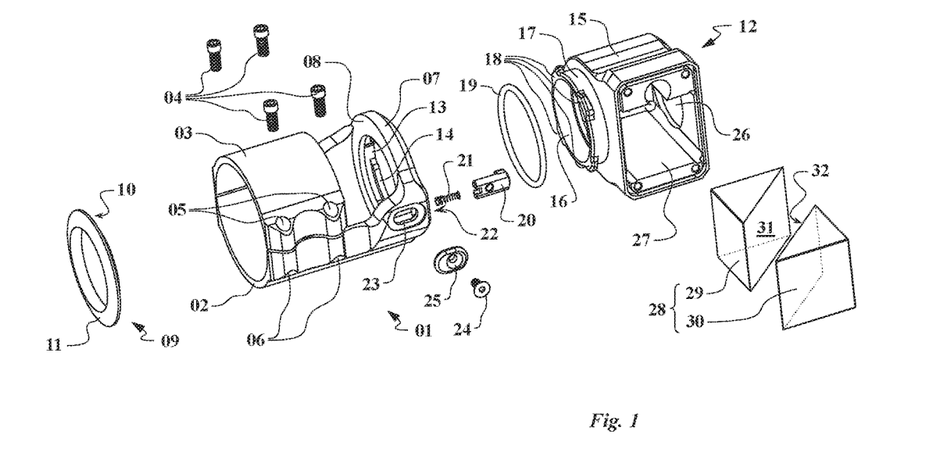
FIG. 1 shows an exploded view of the assembly module and the deflection module of a first embodiment of a camera device according to the invention.

In FIG. 1, a first embodiment of the invention is illustrated. The optical device or the eyepiece tube of the telescopic sight, respectively, on which the assembly module is placed, is not illustrated for the sake of a clearer illustration.

The assembly module 01 comprises a first assembly shell 02 and a second assembly shell 03. The two assembly shells 02 and 03 are connected to each other via a clamping device which comprises four clamping screws 04, said clamping screws engaging through recesses 05 arranged at the edge of the assembly shell 03 and engaging with recesses 06 provided with internal threads.

In the area of its end pointing away from the telescopic sight, the assembly module 01 is provided with a fastening ring 07. The fastening ring 07 is molded in one piece to the assembly shell 02 and comprises a bearing surface 08 at its side pointing towards the telescopic sight. A centering ring 09 is provided with a flat bearing surface 10 at its side pointing towards the bearing surface. At its opposing side, the centering ring comprises a conical surface 11. The centering ring is inserted into the assembly module in the position illustrated in FIG. 1 until its surface 10 comes to bear against the bearing surface 08 of the fastening ring 07.

The assembly shell 03 has a shorter length than the assembly shell 02, so that the assembly shell 02 ends with a spacing from the fastening ring 07, and a window is formed between the assembly shells 02 and 03 as well as the fastening ring 07.

When the assembly module 01 is now attached to the eyepiece tube of a telescopic sight until the conical surface 11 of the centering ring 09 comes to bear against the collar-side edge of the eyepiece tube, an automatic centering in relation to the optical axis of the telescopic sight takes place due to the conical surface engaging with the edge of the eyepiece. When tightening the clamping screws 04, the two assembly shells 02 and 03 are clamped against the eyepiece tube, so that a mechanically firm connection of the assembly module to the eyepiece tube is realized. Since no clamping forces are transferred between the assembly shell 03 and the fastening ring 07 in the window, a diopter setting arranged in this area at the collar-side edge of the eyepiece tube can be actuated without having to release the clamping, if applicable.

The fastening ring 07 is provided with a fastening device in the form of a bayonet catch for fastening a deflection module at the side of the fastening ring 07 pointing away from the bearing surface 08. The bayonet catch comprises an inner ring 14 having four locking recesses 13 formed at the inner ring 14 at equal angle distances. In the area of a first housing aperture 16 of the housing 15, the housing 15 of the deflection module 12 is provided with a protrusion 17 surrounding said housing aperture, the outer diameter of said protrusion 17 being slightly smaller than the inner diameter of the inner ring 14. Four locking projections 18 are provided at the protrusion 17, the arrangement of said locking projections 18 corresponding to the arrangement of the locking recesses 13. For connecting the assembly module 01 and the deflection module 12, the deflection module 12 is inserted into the locking recesses 13 with its locking projections 18, and is turned until the locking projections 18 get behind the inner ring 14. The surfaces of the locking projections 18 pointing away from the telescopic sight can be formed slightly ascending in the circumferential direction, so that, when turning the deflection module relative to the assembly module 01, an automatic axial clamping free of play is realized. In order to seal the device, a sealing ring 19 is provided, said sealing ring being pressed between the frontal side of the protrusion 17 and the assigned surface of the fastening ring 07.

Furthermore, a locking device is provided at the fastening ring 07. Said locking device consists of a safety latch 20 which is pre-stressed by a spring 21 and is displaceably arranged in a recess 22 open at the frontal side in the fastening ring 07. The recess 22 comprises a lateral aperture 23 in the type of an elongated hole. Through said opening 23, the safety latch 20 is connected via a screw 24 to an actuating element 25 in the form of a slider. Due to the pre-stressing by the spring 21, the safety latch 20 is pushed outward and thus engages with the area between two adjacent locking projections 18 when the deflection module 12 is in the mounted state, so that a turning and therefore an unintended release of the connection between the assembly module and the deflection module is no longer possible. If, for an intentional release of the connection of the safety latch 20, the actuating element 25, in order to be pushed back against the spring force, is retracted entirely into the recess 22, the safety latch becomes disengaged from the locking projections 18, so that the deflection module 12 is turnable and can thus be detached from the assembly module 01.

The fastening ring 07 comprises another recess offset by 180 degrees, said recess being identical to the recess 20. Thus, the locking device can easily be re-arranged offset by 180 degrees.

The housing 15 of the deflection module 12 comprises three housing apertures 16, 26 and 27. The housing apertures 16 and 26 are located behind each other in relation to the optical axis of the telescopic sight; the housing aperture 27 is arranged at right angles thereto. A deflection device 28 is arranged in the housing 13. The deflection device comprises two partial prisms 29 and 30 which are connected to each other along their diagonal boundary surfaces 31 and 32. The connection can be carried out via gluing or via adhesion forces due to the adjacent polished boundary surfaces 31 and 32. Thus, the boundary surfaces act as a semi-permeable mirror, so that an observer looking through the housing aperture 26 can see the image coming out of the eyepiece tube and said image can also be deflected via the boundary surface effects by 90 degrees in the direction through the housing aperture 27.

Figure 2:
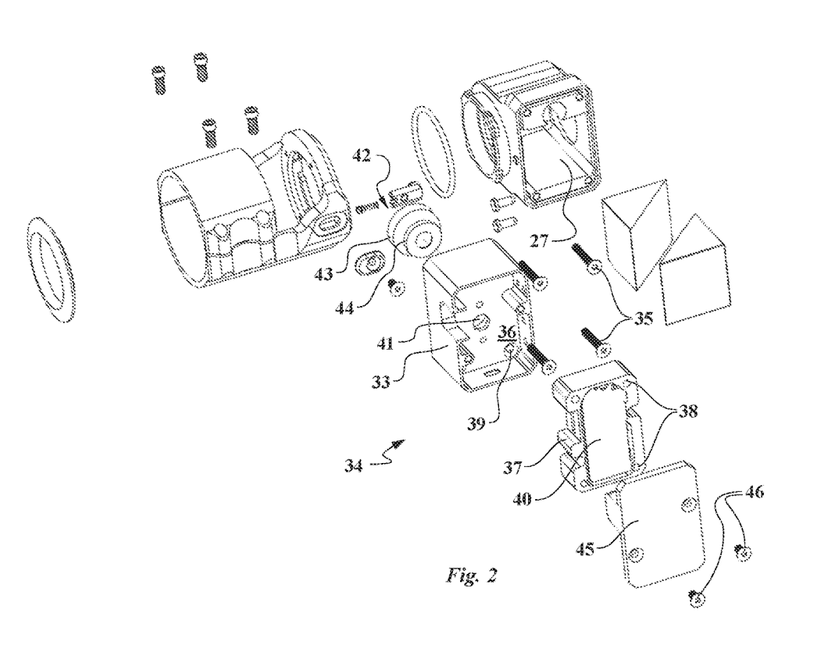
FIG. 2 shows the embodiment according to FIG. 1 with the camera module also in an exploded view.

The housing 33 of a camera module 34 is screwed onto the housing 15 by means of fastening screws 35 in the area of the housing aperture 27. The housing 33 comprises an intermediate shelf 36 which divides the housing 33 into two chambers. A carrier plate 37 made of plastic is arranged in the chamber pointing away from the deflection module 12, said carrier plate 37 being screwed to the housing 33 via the fastening screws 35 which engage through the carrier plate 37 as well as through the intermediate shelf 36 in recesses 38 and 39. A circuit board 40 is arranged at the side of the carrier plate 37 pointing away from the intermediate shelf 36, said circuit board 40 comprising the essential electric and electronic components, including the image sensor of the camera unit. The image sensor is arranged at the side of the circuit board 40 pointing towards the deflection module 12 in the area of a continuous recess in the carrier plate 37. In the optical axis of the image sensor, another recess 41 is arranged in the intermediate shelf 36 of the housing 33 in such a way that the optical axis between image sensor, recess in the carrier plate and recess 41 in the intermediate shelf cuts the boundary surface of the two partial prisms 29 and 30 essentially in the middle.

In order to project the image appearing on the boundary surface of the partial prisms onto the image sensor, a lens device 42 is provided, between the intermediate shelf 36 of the housing 33 and the prism arrangement. Said lens device comprises a housing 43 having a molded band 44. The intermediate shelf 36 comprises a recess arranged concentrically to the recess 41 on its side pointing towards the deflection module 12, into which recess the band 44 of the lens device 42 is insertable in such a way that the optical axes of the lens device 42 and the image sensor are aligned flush. The focal length of the lens device 42 is chosen such that the image appearing on the boundary surfaces is essentially projected entirely and with sufficient definition onto the image sensor.

Figure 3:
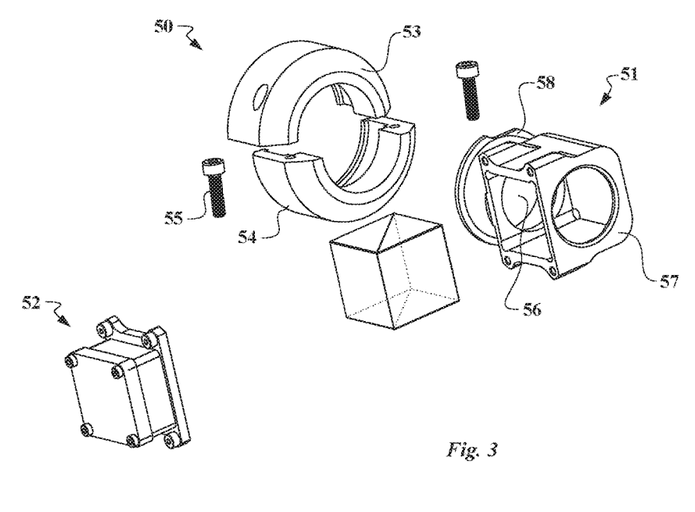
FIG. 3 shows a second embodiment of a camera device according to the invention in a view corresponding to FIG. 1.

The embodiment illustrated in FIG. 3 basically has the same structure comprising the assembly module 50, the deflection module 51 and the camera module 52. The camera module and the deflection module are largely identical to the corresponding modules of the embodiment described above. In contrast to the embodiment described above, however, the assembly module 50 comprises two essentially identical semi-shells 53 and 54 which are clampable against each other via clamping screws 55 while enclosing the collar-side end of the eyepiece tube and a collar 58 surrounding the first aperture 56 of the deflection housing 57. The advantage of said embodiment is above all that the camera module can be fastened to the eyepiece tube so as to be pivotable at any desired angle.

The housing 33 of the camera module 34 is closed via a housing lid 45 which is fastened using screws 46. The power supply arranged in the housing as well as the actuating elements are not depicted for the sake of a clearer illustration.

The invention claimed is:

1. A camera device for fastening to an eyepiece tube of an optical device, said camera device comprising:
   an assembly module including two assembly shells for fastening the camera device to the eyepiece tube;
   a deflection module having an image deflection device for image deflection from the axis of the optical device, arranged in a housing, wherein the image deflection device is semi-permeable and is formed and arranged in such a way that viewing through the optical device is enabled when the camera device is arranged on the optical device; and a camera module for recording and/or forwarding the image, wherein the assembly module, the deflection module and/or the camera module are detachably connected with each other, in which proximal to an end of the assembly module pointing towards the deflection module, the assembly module includes a fastening ring having a fastening device detachably fastening the deflection module, said fastening ring including a bearing surface on its side pointing towards the optical device for direct or indirect bearing of the frontal end of the eyepiece tube, and in which the fastening ring is molded in one piece to one of the two assembly shells.

2. The camera device according to claim 1, in which the bearing surface is at least slightly conical.

3. The camera device according to claim 1, in which a centering ring is arranged between the frontal end of the eyepiece tube and the bearing surface, said centering ring being formed at least slightly conical on its side pointing towards the eyepiece.

4. The camera device according to claim 1, in which the fastening device is formed in a bayonet catch having at least two locking recesses with which locking projections, each being arranged complementary thereto in form and/or function at the housing of the deflection module, are detachably engageable via an insert-and-turn movement.

5. The camera device according to claim 4, in which at least four locking recesses are provided in the fastening device.

6. The camera device according to claim 1, in which a locking device is provided at the fastening ring, said locking device preventing an unintentional detachment of the deflection module from the assembly module.

7. The camera device according to claim 1, in which the housing of the deflection module has a first housing aperture, a second housing aperture and a third housing aperture, wherein the first housing aperture and the second housing aperture are aligned behind each other in the direction of the optical axis of the optical device, and the third housing aperture is arranged angularly and wherein the device for image deflection is arranged in the housing in such a way that the image entering via the first housing aperture along the optical axis of the optical device is forwarded by the semi-permeable device for image deflection via the second housing aperture and the third housing aperture out of the deflection module.

8. The camera device according to claim 7, in which the assembly module includes two semi-shells which are clampable against each other while enclosing a collar-side end of the eyepiece tube and a collar surrounding the first aperture of the deflection housing at least in sections, wherein the deflection module is essentially freely turnable relative to the assembly module when the clamping device is released at least slightly.

9. The camera device according to claim 1, in which the device for image deflection comprises a semi-permeable mirror or a semi-permeable prism arrangement.

10. The camera device according to claim 1, includes a lens device arranged in the housing of the deflection module upstream or downstream of the device for image deflection and/or in the housing of the camera module.

11. The camera device according to claim 1, in which the camera module includes at least one image sensor arranged in the housing of the camera module.

12. The camera device according to claim 11, in which the at least one image sensor, devices for processing, storing and/or forwarding the data from the image sensor and/or a circuit board are arranged on a plastic carrier made of an electrically non-conducting material.

13. The camera device according to claim 1, in which the camera module includes at least one device for processing, storing and/or forwarding the data from an image sensor forming part of the camera module.

14. The camera device according to claim 1, in which an image sensor forming part of the camera module, a device for processing data from the image sensor, a device for storing data from the image sensor and/or a device for forwarding the data from the image sensor are arranged on a circuit board.

15. The camera device according to claim 1, in which assembly shells forming part of the assembly module, the housing of the deflection module and/or a housing of the camera module consist of metal.

16. The camera device according to claim 1, wherein a space essentially corresponding to the outer contour of the eyepiece tube is formed between the two assembly shells, wherein both assembly shells are clampable against each other by a clamping device, enclosing the eyepiece tube in a force-fitting and/or form-fitting manner at least in sections.

17. A camera device for fastening to an eyepiece tube of an optical device, said camera device comprising:
an assembly module including two assembly shells for fastening the camera device to the eyepiece tube;
a deflection module having an image deflection device for image deflection from the axis of the optical device, arranged in a housing, wherein the image deflection device is semi-permeable and is formed and arranged in such a way that viewing through the optical device is enabled when the camera device is arranged on the optical device; and
a camera module for recording and/or forwarding the image, wherein the assembly module, the deflection module and/or the camera module are detachably connected with each other, in which proximal to an end of the assembly module pointing towards the deflection module, the assembly module includes a fastening ring having a fastening device detachably fastening the deflection module, said fastening ring including a bearing surface on its side pointing towards the optical device for direct or indirect bearing of the frontal end of the eyepiece tube, and in which one of the two assembly shells ends with a spacing from the fastening ring.

18. The camera device according to claim 17, in which the fastening ring is molded in one piece to a first one of the two assembly shells.

19. A camera device for fastening to an eyepiece tube of an optical device, said camera device comprising:
an assembly module for fastening the camera device to the eyepiece tube;
a deflection module having an image deflection device for image deflection from the axis of the optical device, arranged in a housing, wherein the image deflection device is semi-permeable and is formed and arranged in such a way that viewing through the optical device is enabled when the camera device is arranged on the optical device; and
a camera module for recording and/or forwarding the image, wherein the assembly module, the deflection module and/or the camera module are detachably connected with each other, in which proximal to an end of the assembly module pointing towards the deflection module, the assembly module includes a fastening ring having a fastening device detachably fastening the deflection module, said fastening ring including a bearing surface on its side pointing towards the optical device for direct or indirect bearing of the frontal end of the eyepiece tube, in which a locking device is provided at the fastening ring, said locking device preventing an unintentional detachment of the deflection module from the assembly module and in which the locking device includes a spring-mounted safety latch which is displaceably mounted in a recess of the fastening ring, wherein the safety latch is brought, via an actuating element, from a first position, in which a turning of the deflection module relative to the assembly module is blocked, into a second position, in which the deflection module and the assembly module are turnable relative to each other.

20. The camera device according to claim 19, in which the assembly module includes a double-shell structure having two assembly shells, wherein a space essentially corresponding to the outer contour of the eyepiece tube is formed between the two assembly shells, wherein both assembly shells are clampable against each other by a clamping device, enclosing the eyepiece tube in a force-fitting and/or form-fitting manner at least in sections.

21. The camera device according to claim 20, in which the clamping device includes at least one clamping screw which engages through one of two assembly shells in a recess arranged at its edge and engages with an inner thread likewise arranged at the edge of the other one of the two assembly shells.

* * * * *